United States Patent [19]

Moore

[11] Patent Number: 4,459,972
[45] Date of Patent: Jul. 17, 1984

[54] HELIOSTAT ASSEMBLY

[75] Inventor: Walter T. Moore, Camarillo, Calif.

[73] Assignee: Veda Incorporated, Arlington, Va.

[21] Appl. No.: 309,053

[22] Filed: Oct. 6, 1981

[51] Int. Cl.³ .............................................. F24J 3/02
[52] U.S. Cl. .................................. 126/424; 126/438; 126/452; 126/418; 350/289; 353/3
[58] Field of Search ............... 126/438, 439, 425, 424, 126/452, 418; 350/288, 289; 353/3

[56] References Cited

U.S. PATENT DOCUMENTS

| 3,656,844 | 4/1972 | Botskor . | |
|---|---|---|---|
| 4,137,897 | 2/1979 | Moore . | |
| 4,148,299 | 4/1979 | Sherman, Jr. . | |
| 4,154,219 | 5/1979 | Gupta et al. . | |
| 4,158,356 | 6/1979 | Winiger | 126/438 |
| 4,187,123 | 2/1980 | Diggs | 126/425 |
| 4,198,954 | 4/1980 | Meijer | 126/425 |
| 4,202,321 | 5/1980 | Volna . | |
| 4,218,114 | 8/1980 | Bunch | 126/438 X |
| 4,222,368 | 9/1980 | Rost et al. | 126/438 |
| 4,226,502 | 10/1980 | Gunzler . | |
| 4,227,513 | 10/1980 | Blake et al. | 126/438 X |

Primary Examiner—Larry Jones
Attorney, Agent, or Firm—Finnegan, Henderson, Farabow, Garrett & Dunner

[57] ABSTRACT

An improved heliostat comprises a focusing reflector having a toroidal configuration. Mounting means for the reflector comprises means defining a first axis parallel to the earth's polar axis, and means defining a declination axis perpendicular to the first axis. The reflector is mounted for rotation about the declination axis. The means defining the declination axis and the reflector are jointly rotatable about the first axis. A field of heliostats in accordance with the present invention may be arranged to reflect solar radiation to a common receiver. A suitable heliostat field arrangement is a field lying in a plane which is inclined with respect to a horizontal plane at the earth's surface. Also disclosed is a deflecting means for each heliostat facilitating rapid focusing of all heliostats in a field upon the receiver, or rapid defocusing of the field.

27 Claims, 13 Drawing Figures

HELIOSTAT ASSEMBLY

BACKGROUND OF THE INVENTION

The use of solar energy for any high power application is hindered by the diffuse nature of solar energy. In mid-latitudes a nominal noon-time energy density at sea level is only about 1,000 watts per sq. meter at normal incidence. This is equivalent to about 317 btu. per sq. ft. per hour. A perfect collector would require about 960 sq. meters (3150 sq. ft.) to capture $10^6$ btu. per hour. Without some means for concentrating sunlight, the stagnation temperature of a black body exposed to this radiant flux is only about 100° C. Since the amount of thermal energy available to do useful work is only that available between the temperatures of the best source and the sink, any prime mover operating at this low an input temperature and outputting waste heat at atmospheric conditions would have very low efficiency.

Concentration of solar energy can be accomplished through the use of lenses, parabolic concentrators, and heliostats. If one wishes to collect 1,000 megawatts of solar thermal energy, a perfect collector system would require a minimum collector area of one square kilometer. A single lens or parabolic concentrator of this size would obviously be an impractically large piece of hardware to mount on a two-axis tracking mechanism. On the other hand, a large heliostat field can be assembled of conveniently sized units, and the total power can be delivered to a conveniently accessible location. The commonly known heliostat field arrangements are capable of providing average flux levels at the receiver of only about 350–900 kilowatts per sq. meter with peak flux on the order of 2–3 times the average value. Stagnation temperatures for these average flux levels range from about 1,575°–2000° K. (2377°–3133° F.).

Use of solar energy as a cost effective heat source for high temperature industrial processes has been, at best, extremely difficult. High temperatures generally go hand-in-hand with high heat rates, and the ability to collect and concentrate solar energy to produce such heat rates has been limited. Two types of solar collector systems provide limited capabilities in this range.

A tracking parabolic point focus solar energy collector is capable of providing high temperatures. However, its heat rate is limited by the mechanical constraints associated with physical size of the individual collector. Furthermore, use of a tracking parabolic concentrator requires the solar power consuming load to move with the concentrator, causing a constant change in both location and orientation of the load with respect to gravity. This presents serious technical problems for many high temperature processes. Additionally, limitations in piping material, transport fluids, and joint technology preclude transfer of heat from the focal zone of the movable parabolic concentrator to a fixed process location at temperatures above about 1500° K.

Solar Collector systems known as "central receiver" or "central power" systems comprise a fixed location for the solar power consuming load, referred to as the "receiver". The power collecting concentrator uses a large field of heliostats, i.e., mirrors which always reflect the sun's image in the same direction to bring the energy from several hundred or several thousand square meters of mirror surface to a single focal zone for the field. Thus, the problems of a moving receiver, as associated with the parabolic sun tracker, are eliminated and the process can be oriented in the most suitable manner.

A widely known central receiver system is known as a horizontal, or surround, field configuration. In this system, heliostats are arranged in essentially a horizontal plane surrounding a tower on which the receiver is located. With this configuration, the solar power consuming load is located high above the level of the field of heliostats. If one considers the northerly radius from the base of the tower to the arc along which the farthest heliostats lie, the height of the tower is about one-third of this distance in conventional arrangements. This height is necessary to permit reasonably efficient land use without each heliostat excessively obscuring the view, from the receiver, of each successively farther heliostat along the same field radial.

An alternate arrangement of a heliostat field is described in U.S. Pat. No. 4,137,897. In this arrangement, the heliostats are arranged in terraced rows so they are elevated successively higher above the local terrain as one moves away from the earth's equator. This permits much closer spacing of the heliostats and more efficient land use. However, the main advantage of such an arrangement is that it permits locating the receiver at any height convenient to the process which will utilize the energy, rather than requiring that the process be located atop a tower or at a point to which it is convenient to transfer the energy collected by the heliostat field.

In any central receiver system, since the energy collected from a large number of heliostats is redirected to a fixed location, much higher heat rates are obtainable than with a single parabolic sun tracker of practical size.

The terraced heliostat field arrangement of U.S. Pat. No. 4,137,897 minimizes land use for such a field and eliminates the necessity of a tower supporting the receiver at an inconvenient height. However, a problem common to all known heliostat field arrangements is variation in the reflected image size and shape, and in the radiant flux distribution across the image as a function of the time of day and year.

The minimum diameter of the solar image is determined by the product of the distance from the heliostat to the receiver and the sun's angular diameter in radians. Minimum diameter can be achieved only if the heliostat is in perfect focus. The area of the image increases as the square of the distance between heliostat and receiver. Thus, even a perfectly focused image will have a lower flux density for a longer separation distance if the total mirror area is held constant.

In conventional heliostat fields using conventional heliostats, the focus is set for each heliostat to be best for design point of the system. This does not mean that each heliostat is in perfect focus at that time, but that solar image formation is as close to desired size, shape, and flux density as may be obtainable at reasonable cost. The optical aberrations known as sagittal and tangential foci are partially corrected for this particular time of day and year. At any time other than design point time these aberrations may be better or worse than if a different heliostat design were used. Essentially, under this set of alignment procedures, each heliostat is individually adjusted to a particular curvature. Throughout the day and year a wide range of off-axis angles and space orientations of the plane of sun-heliostat-receiver angle is encountered. The solar image at the receiver is a composite of all of the variously aberrated images formed by the respective heliostats in the field, each of which is in a different degree of aberration.

A heliostat is characterized by the type of mounting, i.e., the orientation of the at least two orthogonal axes which are required to properly position the mirror to direct solar energy to the stationary receiver. The heliostat mirror element is attached so it may be rotated about one direction on the mirror surface, this direction being parallel to one of the axes of the mount. This axis of the mount is attached to another member parallel to the other axis of the mount. In turn, this member rotates about this other axis, which is rigidly held in place and maintained in a fixed position with respect to the earth. Thus assuming that clearances permit, the normal to the mirror element may be pointed in any direction in the spherical volume centered on the point of intersection of the two axes of the mount.

In, for example, earth based radar systems, intended to observe objects constrained to move on or near the earth's surface, the conventional axes chosen are an azimuth axis and an altitude or elevation axis. The azimuth axis is oriented in a vertical direction in respect to the local tangent plane, and is effectively attached thereto. The altitude axis is rigidly attached to a member which rotates about the azimuth axis. The radar antenna is attached to the altitude axis and rotates about it. This type of mount is known as an altazimuth or azimuth/elevation mechanism. When applied to positioning a heliostat, the mirror is attached in the same manner that the radar antenna was attached. However, altazimuth systems are generally cumbersome when used for tracking astronomical objects located at substantial distances from the earth.

Telescopes used for astronomical work generally utilize a different orientation of the two orthogonal axes. This type of mount is known as an equatorial mechanism. The axis direction which is effectively fixed with respect to the earth is known as the polar axis since it is oriented parallel to the earth's polar axis. The axis upon which the telescope is mounted is known as the declination axis, since rotation about this axis will adjust the telescope sighting direction to different declinations. Rotation of the declination axis about the polar axis points the telescope to different angles (hour angles) in respect to the local meridian plane. Since a telescope points directly at an object being tracked, the rate of tracking an astronomical object about the polar axis is exactly equal to the apparent earth rotation rate, and the rate of tracking about the declination axis is the rate of change of declination due to the earth's motion along its orbit about the sun. Thus an equatorial mount used for a telescope would require major rotation only about the polar axis in order to track an astronomical object, such as a star, throughout the day, rotation about the declination axis to adjust for movement of the earth along its orbital path being at most a few tenths of a degree per day. Most known equatorial mounts therefore include means facilitating only limited movement about the declination axis.

The equatorial mount for a heliostat differs in an important respect from the equatorial mount for a telescope. A telescope requires access to the circumpolar region in its hemisphere. This is not the case for most locations of a heliostat in a field. It is more likely that the heliostat requires greater access toward the equator than toward the earth's polar direction. Hence, clearance conditions for the heliostat must be properly evaluated in determining the design of a suitable equatorial mount and drive mechanism. Such an arrangement must be extremely versatile as the heliostat might also be required to direct reflected radiation away from the equator.

If we mount a heliostat mirror on either of these devices the rotation rates will be different from the rates required for radar or a telescope, respectively. For an altazimuth mounted heliostat there is no constant rate about either axis no matter which direction the reflected ray may be chosen. For the equatorial mounted heliostat, a constant rate of rotation about the polar axis may be maintained at certain times under limited conditions, as discussed below.

The motion of a heliostat is perhaps easiest to understand if one keeps in mind that the reflected ray stays fixed in space, and the plane of the angle from sun to heliostat to reflected ray direction rotates about the reflected ray. The magnitude of the sun-heliostat-reflected-ray angle varies throughout the day, and the normal to the heliostat mirror must always bisect that angle. A common misconception often expressed in many physical science texts and many heliostat patents is that the heliostat "tracks at half sun rate", and it is assumed that this means half the apparent rate in altitude and half the apparent rate in azimuth, or half earth rate in polar, and half declination rate (see, e.g., U.S. Pat. No. 3,656,844). In reality, what tracking at half sun rate means is that the bisector of the sun-heliostat-reflected-ray angle moves at half the rate of change of that angle in the coordinates of the rotating axes of the heliostat positioning device.

Special conditions will call for rotation about one or the other of the axes at "half sun rate". If, and only if, the reflected ray direction is directly along the polar axis of an equatorial mount, the polar rotation rate is exactly the apparent earth rotation rate. The rate about the declination axis under such conditions will be exactly half declination rate. Alternatively, for the equatorially mounted heliostat, if, and only if, the sun's declination and the site latitude are the same and the reflected ray direction also lies in that plane, then the rotation rate about the polar axis is exactly half earth rate and the declination rate must be zero. Since this can occur at most twice a year, it is obviously a rare occurence.

It is especially important to recognize that, for any conditions other than those specified, the rotation rate about each axis varies throughout each day and throughout the year. Also, each heliostat in a field will generally be directing its reflected ray in a slightly different direction in order to reflect all radiation on a common receiver. Thus, each heliostat must rotate at a rate peculiar to itself. This requires individually controllable variable drive means for each heliostat.

Although many studies have shown that more than 50 percent of the total energy used in the United States is for processes having end temperatures above 811° K. (1000° F.), attempts to provide this energy using solar concentrating collectors have been limited to small scale applications. This limited development is due partly to the lack of a heliostat which will provide a very small, uniform solar image at the receiver. Such an image is required in order for solar energy to become a cost effective substitute for power which has heretofore been derived from fossil or nuclear fuels. This requirement arises primarily out of the fact that radiant energy losses become very large as the temperature increases. Conduction and convection losses account for the greatest portion of heat loss in conventional, non-solar powered, high temperature processes. In solar powered systems, the high temperature surface cannot be insulated from ambient conditions, and must be exposed to the incoming radiant power. As in conventional systems, at temperatures below about 1000° K. (1340° F.) conduction and convection are the major loss methods for solar powered processes. Above 1000° K. the radiation losses dominate since the reradiation power is directly proportional to the product of the exposed area and the fourth power of the absolute temperature of the surface. It becomes essential that reradiation losses at the higher temperatures be minimized. Reducing the aperture required for a given input power is the best way to reduce these losses.

It is thus evident that most of the limitations which restrict the use of the solar central receiver system are related to costs associated with the heretofore excessively large heliostat field required, uniformity of the reflected image size and shape, and the radiant flux distribution across the image as a function of the time of day and year. Also, for the horizontal field, the height of the receiver may be a severe limitation. With the arrangement of U.S. Pat. No. 4,137,897, the latter problem is resolved. Therefore, it is toward reduction of the image size and development of a constant flux distribution that this invention is directed.

Accordingly, this invention provides an improved heliostat apparatus capable of more efficient operation than known devices.

This invention provides a heliostat including an improved combination of reflector and mounting means capable of more efficient operation than known devices.

This invention also provides a heliostat field capable of directing greater levels of solar flux at a receiver or target for a field of a given size.

The present invention provides a heliostat having a reflector of a configuration which is suitable without individual focusing for use at a large number of the locations in a large heliostat field.

The apparatus of the present invention provides a heliostat which produces a very uniform image size and shape throughout the operational year.

It is still another object of this invention to reduce the area of the image reflected from a heliostat to below that obtainable from previously known heliostats of comparable size and mirror area.

This invention provides a heliostat which will produce a solar image which varies only a relatively small amount from the image produced by a continuously focusing heliostat when the range of off-axis angles varies between zero and sixty degrees, this with no change in the curvature of the mirror element during this range of variation of the off-axis angle.

Another object of the invention is to reduce the cost of usable power at the receiver and to decrease thermal loss by facilitating use of a receiver of a smaller physical size than that associated with prior art heliostats.

It is still another object of this invention to provide heliostat means which, used singly or incorporated into a field of such devices, provides improved high temperature capability, smaller image area and uniform and high concentration of radiation incident to the receiver.

A further object of this invention is to provide an equatorially mounted heliostat lower in cost than prior art concepts and capable of directing solar radiation to a receiver located at a variety of positions.

This invention provides a heliostat consisting of a combination of a reflective element of a configuration which is common throughout a large portion of a field of heliostats, and a mounting means, such as will permit direction of the reflected solar image in any desired direction, such that, when used together, the solar image viewed at the receiver location will contain a minimum range of aberrations and remain nearly constant in size and shape throughout many hours of the day and throughout the year.

An additional object of this invention is provision of means for rapidly shifting direction of the reflected ray from each heliostat in a field of heliostats in such a manner that the focal zone for the heliostat field may be transformed from an intense solar image to a very diffuse solar image, or conversely from a diffuse image to an intense solar image, in a time interval much less than one second in duration, thus facilitating rapid change in the level of radiation incident the receiver.

SUMMARY OF THE INVENTION

The present invention comprises an improved heliostat including a focusing reflector having a toroidal configuration associated with an improved equatorial mounting means. When desired, means may be associated with the heliostat for rapidly re-directing the reflected ray in such a manner that the radiation reflected from a heliostat field may be rapidly focused on the receiver or rapidly de-focused.

The invention includes a concave focusing reflector formed as a section of a toroid defined by two unequal radii of curvature in mutually perpendicular planes, means defining a first axis parallel to the earth's polar axis, means defining a declination axis perpendicular to and intersecting the first axis, the means defining the declination axis being fixed to the means defining the first axis, means for mounting the reflector for rotation about both the declination axis and then about the first axis, and means for driving the reflector in rotation at variable speeds about both of the axes. The toroidal reflector comprises a concave section of a toroidal surface defined by two radii of curvature in respective planes which are perpendicular to one another.

The invention may additionally comprise means for supporting the heliostat and for varying the orientation thereof, thereby orienting the first axis parallel to the earth'polar axis. In an exemplary embodiment disclosed herein, such means may comprise a base plate and means for adjusting the position of the base plate. Alternately, as also described herein, such means might comprise a fixed support and wedge means having a configuration chosen so as to align the means defining the first axis with the earth's polar axis.

The reflector is driven in angular motion about both the first axis parallel to the polar axis and about the declination axis. Motion about the polar axis primarily compensates for daily rotation of the earth on its axis and secondarily for the reflected ray direction deviating from the polar axis of the heliostat. Variations in angular motion rates about the declination axis consist of two components. The major component, coupled with variations in the polar axis rotation rate, compensates for the direction of the reflected ray forming a non-zero angle with the polar axis of the heliostat. The other, minor component of the rotation rate about the declination axis is a substantially sinusoidal rate which compensates for changes in the earth's position in its orbit about the sun.

The present invention further comprises heliostats having improved structure and functional features as discussed above used in a field arrangement. The heliostat field of the present invention comprises a plurality of such improved heliostats which are preferably positioned generally in a plane which is inclined with respect to a horizontal plane at the earth's surface. Each of the heliostats in the field reflects solar radiation to a common point or receiver, the plane of the array being inclined upwardly in a direction away from the receiver. In the preferred arrangement, disclosed in aforementioned U.S. Pat. No. 4,137,897, the heliostats of the field are mounted on a terraced wall. In the earth's northern latitudes, the terrace wall faces south, the heliostat being generally aligned in an east-west direction. The terrace steps are upward towards the north and the receiver is situated south of the array. When used in such an arrangement the heliostat of the present invention may provide up to one order of magnitude improvement in radiation concentration capability over other arrangements using conventional heliostats.

Conventional heliostats in the surround field configuration are arranged to defocus the field, in event of failures, in a matter of up to 30 seconds, a time which is expected to be short enough for safe operation. Since the heliostat of this invention is capable of producing flux densities up to an order of magnitude higher than the current approaches, a faster mechanism is required. Accordingly, this invention includes a new approach to heliostat field defocusing which will enable the field to be made safe in less than one second of a system failure requiring power shut down.

The present invention includes, the reflector, means supporting the reflector for rotation about two axes, and means for rapidly altering the spatial relationship between the reflector and at least one of the axes. As embodied herein, such means includes means for altering the position of the reflector of each heliostat in relation to its associated declination axis.

Heliostats of the present invention may initially be oriented so as to reflect solar radiation incident to all of the heliostats in the field to a common receiver. The invention further comprises defocusing means for rapidly directing solar radiation reflected from each heliostat to respective different points. Alternately, the heliostats of the field may initially be oriented to direct solar radiation incident thereto to respective different points. Also as embodied herein, such means may comprise a first bearing element associated with the declination axis and affixed to the reflector at a fixed distance therefrom, a second bearing element associated with the declination axis and mounted to the reflector at a variable distance therefrom, and means for varying the distance of the second bearing element from the reflector. In one embodiment, disclosed herein, the means for varying the distance of the second bearing element from the reflector includes hydraulic actuator means.

The method of the present invention comprises positioning a focusing reflector having a toroidal configuration to receive and reflect solar energy to a fixed position or receiver, rotating the reflector about a first axis parallel to the earth's polar axis at a first rate, independently rotating the reflector about a second axis perpendicular to the first axis, at a second rate, and simultaneously rotating the second axis about the first axis at the first rate. Both of the first and second rates may be variable throughout the day or year, depending upon latitude, sun declination and receiver position. The present method includes directing solar energy to a fixed position which is laterally or vertically displaced from the first axis parallel to the earth's polar axis. The method of the present invention includes operating all of the heliostats in a field in the manner discussed above.

The present method further includes the step of rapidly altering the position of each reflector in a heliostat field, normally directing radiation to a common position, to direct solar energy to respectively different positions different from the common position. This technique is referred to as defocusing the field. The present invention also includes a method of initially directing solar energy from a plurality of toroidal reflectors to respectively different positions, and rapidly altering the position of each of the reflectors to direct solar energy from all of the reflectors to a common point or receiver. Such technique is referred to as focusing the field.

The energy reflected from a single heliostat in accordance with the present invention, or from a field of such heliostats, may be directed to any location above, below, or to either side of the north-south center line of the heliostat or field. This versatility permits a single heliostat or field to provide energy to one or more receivers appropriately located to meet the user's needs. The field is readily adapted to a broad range of utility and brings the benefits of central receiver technology to a wide variety of industrial applications and high temperature processes.

The mounting means of the present invention is an equatorial arrangement comprising means defining a first axis parallel to the earth's polar axis and means defining a declination axis which is perpendicular to and intersects the first axis. Means are provided for rotating the reflector and declination axis about the first axis at a first rate and for rotating the reflector about the declination axis at a second rate.

The efficiency of receivers associated with heliostat arrays can be increased by reducing the area through which thermal losses occur. Since most thermal loss at high temperatures occurs by re-radiation through the aperture through which the solar energy enters the receiver, efficiency is most readily increased by minimizing the aperture size. The limiting factor in reducing aperture size and maintaining an acceptable spillage level of solar flux is related to the optical concentration capability of the individual heliostats in the field. Increasing the optical concentration of a heliostat requires that a focusing mirror be used.

Heliostats for central receiver systems must track to large off-axis angles of sun position. Under these conditions, the formation of a solar image at the normal focal distance of a spherical or parabolic mirror is a rarity rather than a normal occurrence. Instead of a circular spot, two eliptical images are formed at foci which separate in opposite directions from the on-axis focal distance as the off-axis tracking angle increases. These aberrations in the reflected image, due to the sagittal and tangential foci shifts, enlarge the reflected image and reduce the flux density thereof.

The present invention includes an improved reflector in the form of a mirror element having a torodial surface configuration. When combined with the mounting means of the present invention, the toroidal reflector provides a substantial improvement in the quality of the reflected image by producing a very well defined concentrated image of reduced size. The power distribution and size of this image vary only slightly throughout the operational day and year. The novel combination of the toroidal mirror and improved mounting means of the present invention facilitates the additional improvement of reduction in receiver size, thus improving system efficiency.

In operation, the plane of the angle between the incident and reflected rays of each heliostat should ideally be maintained such that its intersection with the mirror remains in a nearly fixed position on the mirror face. When this relationship is maintained, aberrations in the reflected image are reduced substantially.

The reflector of the present invention comprises a segment from the outer surface of a toroidal surface defined by two radii of curvature in mutually perpendicular planes. The radii are unequal in length. The shorter radius of curvature will generally be associated with the the curvature of the toroidal mirror element, the chords of which lie parallel to the declination axis. The minimum off-axis angle will result in the sagittal focal zone, which is produced by this curvature of the mirror face being located nearer the heliostat than the receiver position, and the maximum off-axis angle will result in the sagittal focal zone being farther than the distance between the receiver and the heliostat. The longer radius of curvature or the torodial surface will be associated with the curvature for which the chords are orthogonal to the declination axis direction. This curvature will place the tangential focal zone farther than receiver distance from the heliostat for the minimum off-axis angle and closer to the heliostat than the receiver distance for the maximum off-axis angle. When designing the heliostat to be located in a field of heliostats it will be necessary to assure that the heliostats nearest the receiver produce patterns which lie inside the solar image pattern produced by the farthest heliostat. Proper choice of each radius of curvature with respect to the distance between the heliostat and the receiver all cause the extremes of the sagittal aberrations at the receiver to become equal and likewise the tangential aberrations will become equal. It is also possible to choose the linear dimensions of the heliostat mirror element to equate the extreme dimensions of the sagittal and tangential foci. Thus, the variation of image area for a given heliostat mirror can be minimized and the image at the receiver can be maintained constant and nearly circular throughout the year. When a "north field" of heliostats, that is a field lying north of the receiver rather than a surround field, is composed of such focusing heliostats, the image from all heliostats will fall within the boundaries of the largest image formed by a single heliostat. Since, during each day, the sagittal and tangential zones rotate about the reflected ray, the sum of the images of a field of heliostats will tend to be a circular image of nearly uniform flux density.

The resulting image contains most of the collected power in an area much smaller than that achievable with other types of heliostats. The very high average flux density, when compared to the image from other heliostats, is relatively constant in value across the aperture of the device receiving the collected energy. High average radiant flux improves thermal efficiency and, perhaps of greater importance, makes possible high energy processes where the collected energy impinges directly on the process without requiring an intermediate lossy thermal energy conversion means or method.

Simulation analysis has shown that apparatus in accordance with the present invention is capable of producing flux densities in excess of $7 \times 10^6$ watts per square meter. The image area stays essentially circular thoughout the year, varying by less than 10%, and is smaller than the smallest image formed by previously known heliostats. A further desirable quality is that the flux distribution is more nearly a square wave than guassian. The stagnation temperature at this level is 3060° C. (5540° F.). Very few materials are capable of withstanding this high rate of energy transfer. Steel plate will melt at the rate of about 1/16 in. of thickness per second at such radiation levels. For this reason, it becomes desirable to provide a method for rapidly switching the concentrated solar energy away from an uncooled receiver. In order to test the materials for thermal shock, a similarly rapid switch arrangement for concentrating radiation onto the target is required. For flux levels in excess of about 1 Mw/m$^2$ a removal time of less than one second is preferred. Similarly, rise times of less than one second are preferred for thermal shock testing.

The heliostat of this invention may comprise a fast focusing-defocusing means. The apparatus of the present invention is unique in that the mirror element, being affixed to the declination axis, appears to rotate about its own center during the day. At any particular time during the day, each of the heliostats in the array is pointing in a slightly different direction from every other heliostat. Thus, the rotation of the declination axis is different from heliostat to heliostat. It is this condition which makes possible the focusing or defocusing of the field of heliostats with a simple mechanism built into each heliostat unit. Focusing or defocusing of the array can be accomplished by a mechanism adapted to shift the mirror position of each heliostat relative to its associated declination axis.

The focusing or defocusing effect may be achieved by displacing one edge of the mirror away from the declination axis in the direction of the mirror normal while holding the other edge stationary. Since the mirror element will generally be attached to the means defining the declination axis by bearings, changing the distance between one edge of the mirror and the declination axis can be accomplished by varying the length of the support attachment between the declination axis and the mirror element. This may be accomplished by electromechanical actuators, motor driven cams, hydraulic or pneumatic cylinders, or the like. Self-aligning bearings will generally be required at the axis connections to allow this motion of the mirror. Mechanical stiffness and mass of the moving elements affect the speed at which this can occur.

At latitude 35°, the sun altitude angle is less than 15° for more than one hour after sunrise and for more than one hour before sunset. At this altitude angle, a horizontal heliostat array of the prior art is still partially shaded. Thus, the working day of the prior art horizontal array at winter solstice is limited to about six hours, extending to about ten hours at the equinox and to twelve hours at summer solstice. By comparison, early morning and late afternoon shading for the field disclosed in U.S. Pat. No. 4,137,897 is worst between equinoxes and summer solstice. However, at winter solstice, shading and blocking losses are essentially zero whenever the sun is above the horizon. At times of the year near winter solstice, while the sun is still below 10° altitude, the power delivered to the receiver aperture by the array of the present invention is greater than 50% of the power delivered at local noon. Thus, the working day of the present invention, almost ten hours in length at winter solstice, varies only a few tenths of an hour between winter and summer solstices. For an industrial heat user the constant length day is highly advantageous for personnel and process scheduling. Since the apparatus of the present invention used in the arrangement of the cited patent can be designed to provide nearly constant energy collection for any clear day throughout the year, the industrial user can plan on a nearly uniform process flow.

DESCRIPTION OF THE PREFERRED EMBODIMENTS

Figure 1:
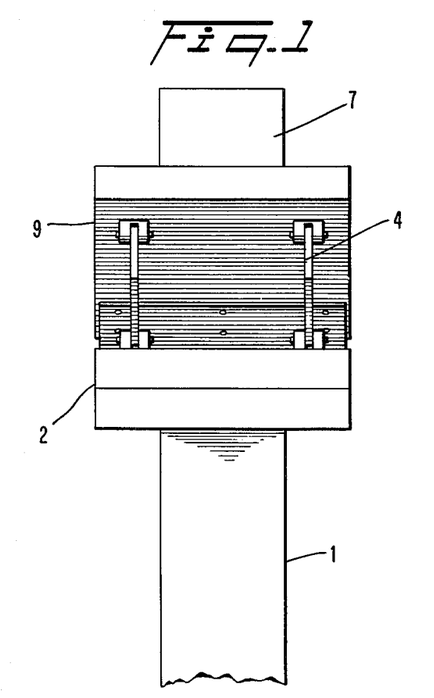
FIGS. 1 and 2 are front and side elevational views, respectively, of an embodiment of the mounting means of the present invention.
Figure 2:
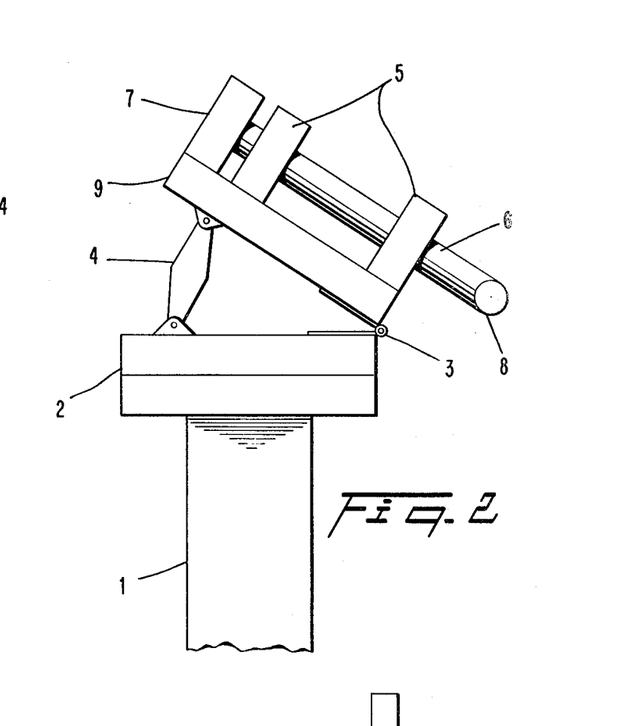

FIGS. 1-2 illustrate a first exemplary embodiment of a mounting means in accordance with the present invention. The mode of operation of the inventive apparatus is readily understood with reference to these figures.

Each heliostat of the present invention comprises a support, illustrated as pedestal 1 in FIGS. 1-2. Plate 2 is supported upon the pedestal so that it may be adjusted about a vertical axis. Adjustable plate 9 is pivotally attached to plate 2 by means of hinge 3 affixed to one end of both plates. Adjustable couplings 4, such as turnbuckles or micrometers, are affixed to plates 2 and 9 proximate the opposite ends thereof.

Bearing means 5 supported on plate 9 rotationally support means 6 defining a first axis of the mounting means of the present invention. Rotation of base plate 2 about a vertical axis with respect to support pedestal 1 adjusts means 6 to lie in the local meridian plane. Adjustment of the angle of separation between plates 2 and 9, by mens of couplings 4, adjusts the angular position of means 6 to compensate for the local latitude. These two adjustments are necessary and sufficient for proper alignment of first axis 6 with the earth's polar axis.

Figure 3:
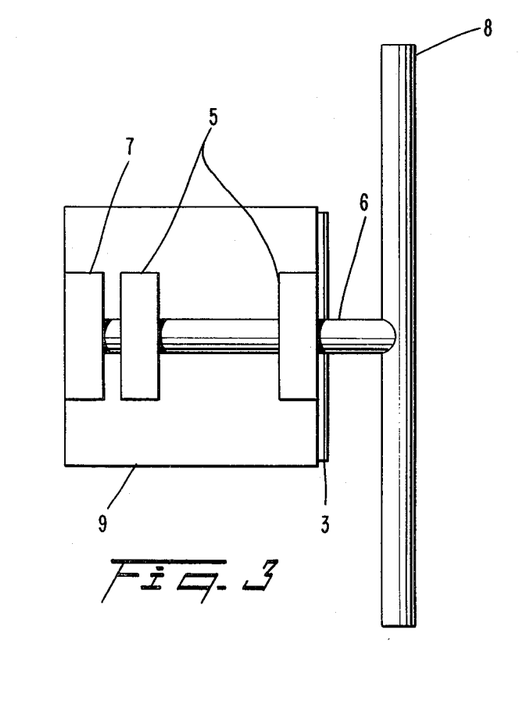
FIG. 3 is a plan view of the mounting means illustrated in FIGS. 1-2.

FIGS. 2-3 illustrate means 8 defining a declination axis perpendicular to and intersecting the first axis 6. Means 8 is adapted to support the reflector of the heliostat of the present invention.

Figure 4:
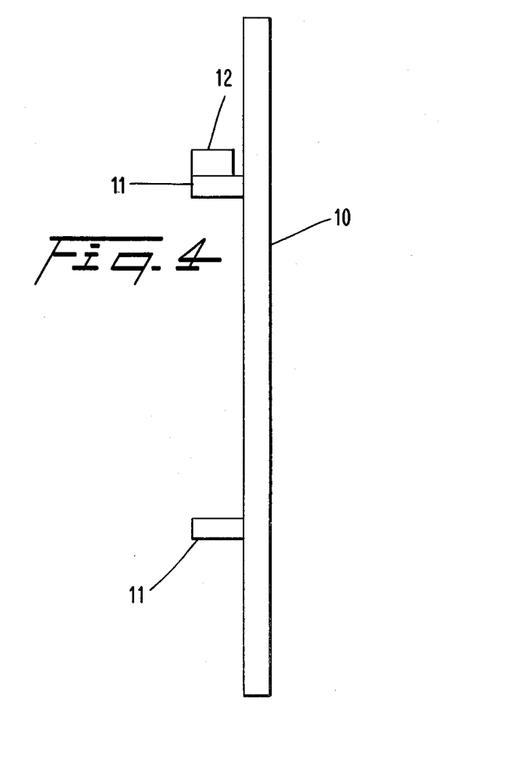
FIG. 4 schematically illustrates a reflector of the present invention with associated mounting and drive means.

FIG. 4 illustrates the general arrangement of elements constituting the reflector of the present invention. Although the reflector of the present invention is actually of toroidal configuration, it is illustrated schematically, for the sake of simplicity, by substantially flat element 10. Supports 11, comprising bearing means, are affixed to the rear surface of the reflector and are adapted to mount the latter on the means defining the declination axis.

Variable speed drive means 7 is attached to plate 9, and is adapted to rotate axle 6 about its first axis parallel to the earth's polar axis. Means 8, defining the declination axis, is fixedly attached to axle 6, and is also rotated about the first axis. The reflector, supported on means 8, also rotates about the first axis. Additional variable drive means 12, associated with the reflector 10 and bearings 11, is adapted to rotate the reflector about the declination axis defined by means 8. The rates of rotation imparted by drive means 7 and 12, respectively, may be controlled independently of one another.

In the embodiment of FIGS. 1-3, the declination axis is situated at the lower end of polar axis 6. This is the general configuration when the array faces the equator and incident radiation is to be reflected toward the equator to a receiver. However, if the solar radiation is to be directed away from the equator to a receiver, the declination axis 8 may be attached at the other end of polar axis 6. This provides for different clearances of the reflector with respect to the mounting means, and reduces shading of the reflectors when reflection is to be in a direction generally away from the equator. A gimbal or toggle arrangement may be used to mount the reflector, so long as clearances required for motion are maintained.

In the above-described embodiment, polar axis 6 is illustrated as a member rotationally mounted in bearings. It is also possible to construct the apparatus in such a manner that member 6 is stationary with bearings interposed between members 6 and 8 to facilitate rotation of the declination axis about the first axis. Likewise, means 8 has been illustrated as a stationary element having reflector 10 rotationally mounted thereon. It is also possible to construct the apparatus in a manner such that reflector 10 is rigidly attached to means 8, which is in turn rotationally mounted to member 6. What is important is that provision must be made for independent rotation about each of the two axes. Furthermore, support means 1 is illustrated as a vertical pedestal in FIGS. 1 and 2. It is not necessary for the support member to be of this configuration. The support for the heliostat of the present invention can assume any configuration which will support the device without interfering with the rotational motions of the reflector.

Figure 5:
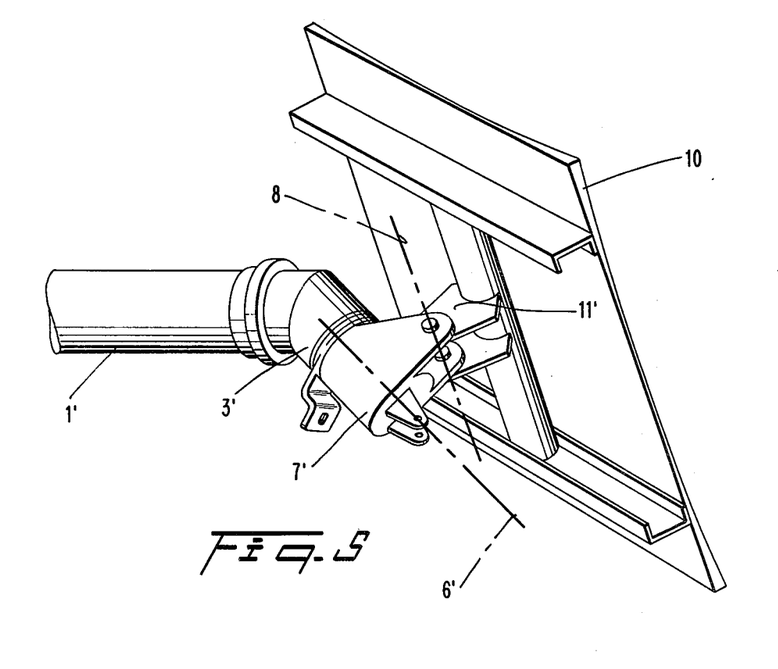
FIG. 5 illustrates a second embodiment of the present invention.

FIG. 5 illustrates another embodiment of the present invention. The heliostat of FIG. 5 is supported on the terraced structure by means of support 1' which is a post-like member which may be oriented in virtually any direction. Affixed to support 1' is a wedge 3' which has a configuration selected so as to orient drive means 7' along an axis 6 parallel to the earth's polar axis. Members 11' rotationally support the reflector 10 about a pviot axis 8, which defines the declination axis. Axis 8 is perpendicular to polar axis 6. Variable drive means 7' rotates the means defining declination axis 8, as well as the reflector 10, about the polar axis. Additional variable drive means (not shown) rotates the reflector 10 about declination axis 8. It is to be understood that wedge 3' can be replaced by an adjustable plate device of the type illustrated in FIGS. 1-2.

Figure 6:
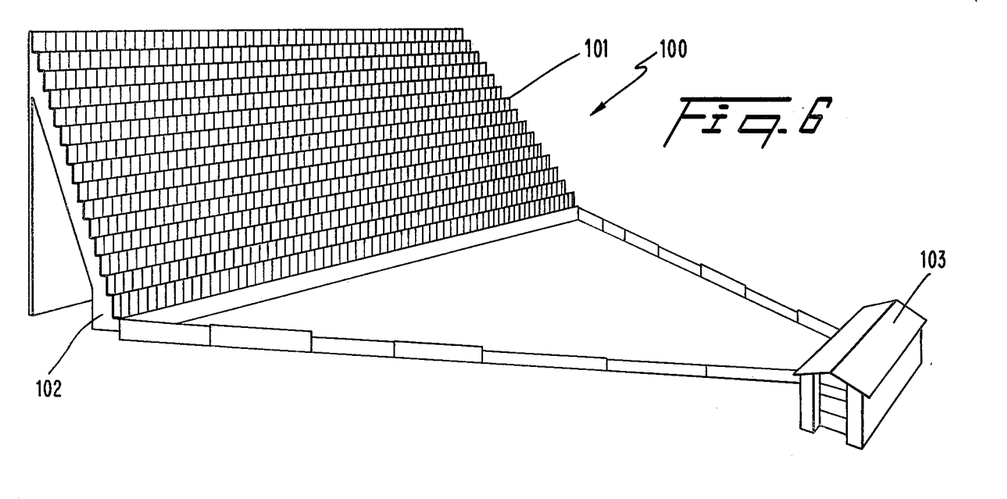
FIG. 6 illustrates a preferred field arrangement and associated receiver for the heliostat of the present invention.

FIG. 6 is a view of a preferred arrangement, in accordance with U.S. Pat. No. 4,137,897 of heliostats of the present invention designated by reference numeral 100. The field comprises numerous heliostats 101 mounted on an inclined terraced structure 102. In the northern hemisphere the field ideally faces south, the levels of the field rising to the north. Reference numeral 103 denotes a receiver comprising a target or fixed point receiving solar radiation reflected from the heliostats of the array.

Figure 7A:
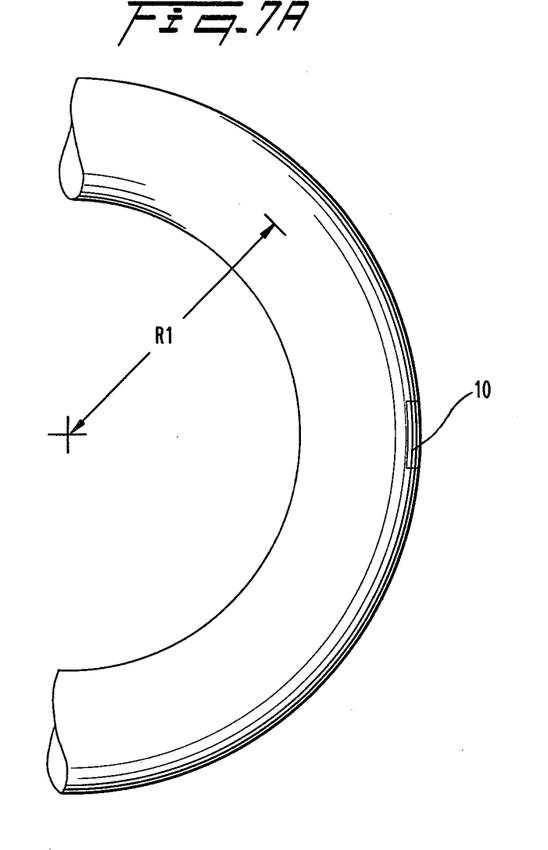
FIGS. 7A and 7B illustrate the relationship of the toroidal reflecting surface in accordance with the present invention to the toroid of which it is a segment.
Figure 7B:
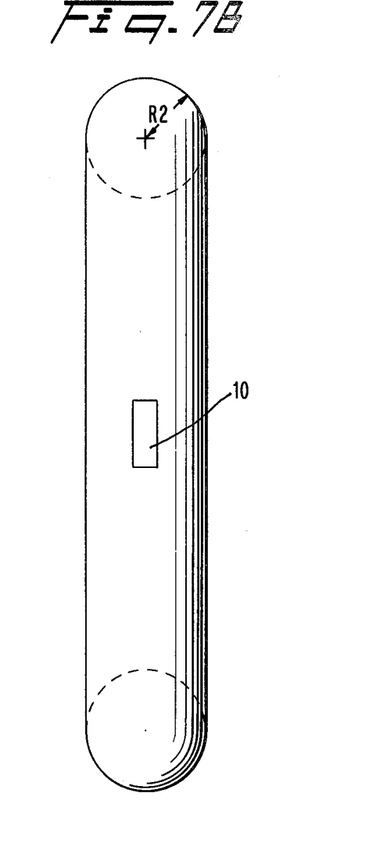

FIGS. 7A and 7B illustrate the configuration of the toroidal reflector of the present invention. The reflector comprises the concave surface of a section of a toroidal surface defined by two unequal radii of curvature lying in mutually perpendicular planes.

The larger radius of the surface equals the sum of $R_1$ and $R_2$, the radii which define the torus, as illustrated in FIGS. 7A-7B. The smaller radius equals $R_2$. $R_1$ and $R_2$ are related to the receiver distance and the range of off-axis angles to be encountered throughout the year. The centers of curvature for the directions on the mirror face which are essentially parallel to the declination axis lie on the radius of curvature which describes the mirror arc perpendicular to the declination axis and passing through the mirror center. Since the longer radius of curvature is not identical in magnitude for mirror arcs nearly parallel to the arc passing through the mirror center, it is essential in ray tracing to proceed first along the arc of the long radius of curvature, and then along the arc of the short radius of curvature to obtain the direction of the normal at the point on the mirror surface which is considered to be the impact point of the incident ray being traced to a reflected destination.

Figure 8:
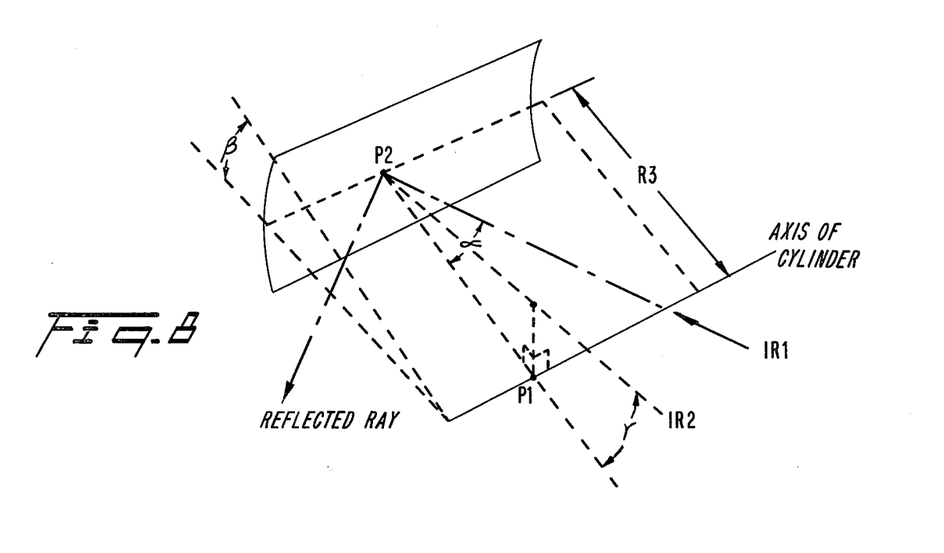
FIGS. 8-9 will be utilized to demonstrate the manner in which solar radiation is reflected by the reflector of the present invention.

In order to understand the behavior of a toroidal mirror segment, it is easier if we first consider a cylindrical mirror element as illustrated in FIG. 8.

Assume a concave segment of a right circular cylinder of radius $R_3$ equal to $R_1$ plus $R_2$ of the torus. Select a diametral plane of the cylinder and select a point $P_1$ on the axis of the cylinder. Erect a radius of the cylinder from $P_1$ in the diametral plane, terminating in a point $P_2$. Assume parallel rays as incident on the cylindrical surface, parallel to the plane. Let alpha be the angle between the incident rays IR1 and $P_1$-$P_2$. If alpha=0°, the reflected rays will converge to a line parallel to the axis of the cylinder and located half way between the axis and the cylindrical surface. The smaller the arc beta, the more nearly the "line" becomes a geometric line having only a single dimension and no cross-section. As alpha increases, the sagittal focal line moves away from the cylindrical surface so that its distance from the cylindrical surface is equal to $(P_1-P_2)/2$ cos alpha. Assuming the same conditions except that the parallel rays IR2 are parallel to the plane of angle beta, which is perpendicular to the diametral plane, and make an angle gamma with $P_1$-$P_2$. When gamma is zero, the tangential focal line is at the same position as it was for alpha=zero. As gamma increases, the tangential focal line moves toward the mirror surface in such a manner that the line is at a distance from $P_2$ equal to $(P_1-P_2)$ cos gamma/2, but not in the diametral plane.

Figure 9:
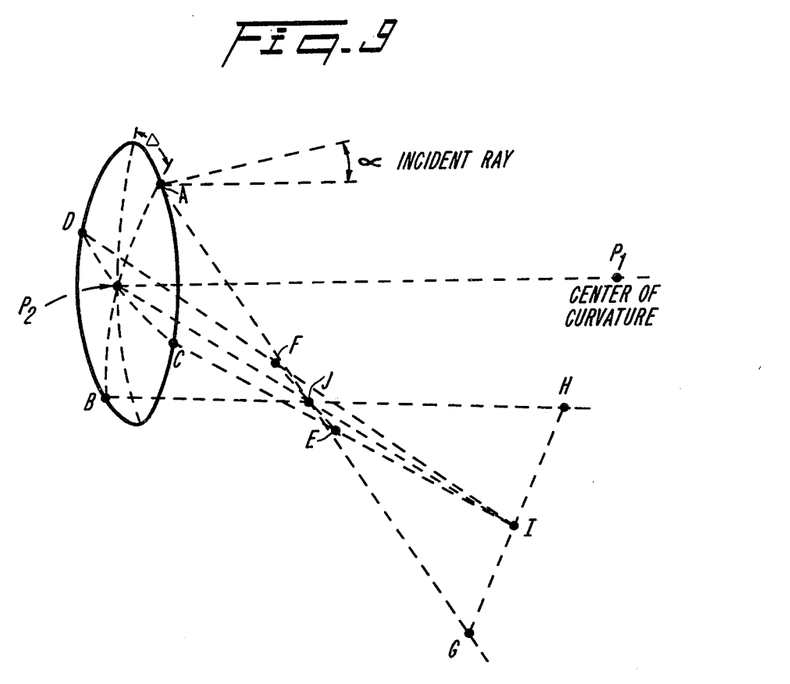

If instead of a cylindrical surface we now consider a spherical surface, as illustrated in FIG. 9, wherein:

alpha is the off-axis angle for incident parallel rays, lying in the plane which contains all of the points $P_1$, $P_2$, A, B, G, H, J, and I;

the plane perpendicular to the above plane contains $P_1$, $P_2$, C, D, E, F, J, and I;

the distance from $P_2$ to J, the midpoint of E-F is $(P_1-P_2)$ cos alpha/2, and lies on the line $P_2$-I;

the distance from $P_2$ to I is $(P_1-P_2)/2$ cos alpha; and the lines E-F, G-I, and $P_2$-I are mutually perpendicular.

(In operation, the line direction $P_2$-I is fixed in space, from the heliostat to the receiver. The plane containing angle alpha rotates about this line.) We will find that paraxial rays, i.e., rays parallel to $P_1$-$P_2$, converge to a "point" at $(P_1-P_2)/2$. If we choose an off-axis angle in any plane, we will find two focal zones, corresponding to the two line positions EF and GH of Fig. 9 described by the above equations for the cylindrical element. At each of these focal zones, the line length will be determined by the length of the boundary rays from the mirror through the other focal zone. The two focal zone lines will be at right angles to each other, since the planes of alpha and gamma are orthogonal, and perpendicular to the direction of the central reflected ray.

If one then considers a toroidal element, it can be seen that each radius of curvature acts independently to cause focusing, and it can also be seen that if the off-axis angle is maintained in either the plane of alpha or gamma, then the effects of the two radii of curvature act independently to form the different focal lines as described for the spherical element. Thus, it becomes possible, for a range of off-axis angles, to choose a radius of curvature for each of the two directions on the toridal surface such that the length of the focal line at the receiver for either direction on the mirror surface at the minimum off-axis angle is equal to the length of that focal line at the maximum off-axis angle. It is then possible to choose the mirror dimensions in these two directions so that maximum dimensions of one pair of focal lines are equal to the maximum dimension of the other pair of focal lines.

The above is the fundamental principle of which the toroidal mirror element is based. Since the sun has a finite angular diameter and rays are therefore not parallel, an additional component of solar image must be considered to minimize the total image excursions. Also, no line image will be formed; instead, the image will be elliptical, degenerating to a circle if the off-axis angle is such that focal lines from both curvatures arrive at the receiver at the same time.

The angle delta is shown as the maximum rotation angle on the mirror face between the plane of angle alpha for either early morning or late afternoon and the plane of the large radius of curvature. For an altazimuth mounted mirror element, angle $\Delta$ may be as much as 180 degrees. For an equatorially mounted mirror element, this angle delta is constrained to about 20 degrees in a field arrangement as in U.S. Pat. No. 4,137,897 previously cited, and to about 60 degrees in a horizontal field arrangement, for the same time of year and length of operating day. The reduced range of angle $\Delta$ using the equatorial mount is due to the fact that, to a stationary observer using the local tangent and meridian planes as reference, the mirror element rotates about the direction of the line containing the centers of curvature for the mirror element.

Figure 10:
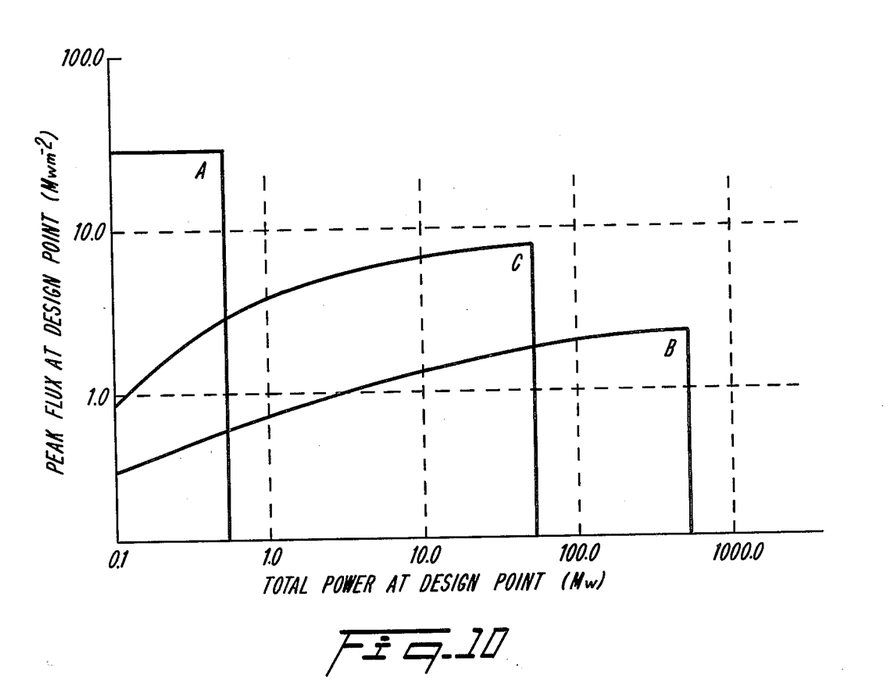
FIG. 10 is a graphical comparison of the power collection capabilities of various types of solar collector arrangements.

The graph of FIG. 10 compares the approximate range of capabilities of practical sized solar collector systems generally suitable for high temperature applications. The ranges shown are based on simulation studies and cost analyses for conceptual designs and projected hardware developments. Only a very small part of the ranges shown actually have been built at this time. The horizontal scale indicates the total power collected by each system, while the vertical scale indicates the peak flux obtainable with each. The point focus tracker (Curve A) reaches a high peak but has a relatively low total power capability. A horizontal field of altazimuth heliostats (Curve B) can collect relatively great amounts of power, but reaches fairly low peaks in output. The heliostat of this invention arranged in a field as shown in U.S. Pat. No. 4,137,897 (Curve C) reaches high peaks while also reaching high levels of total output.

Figure 11:
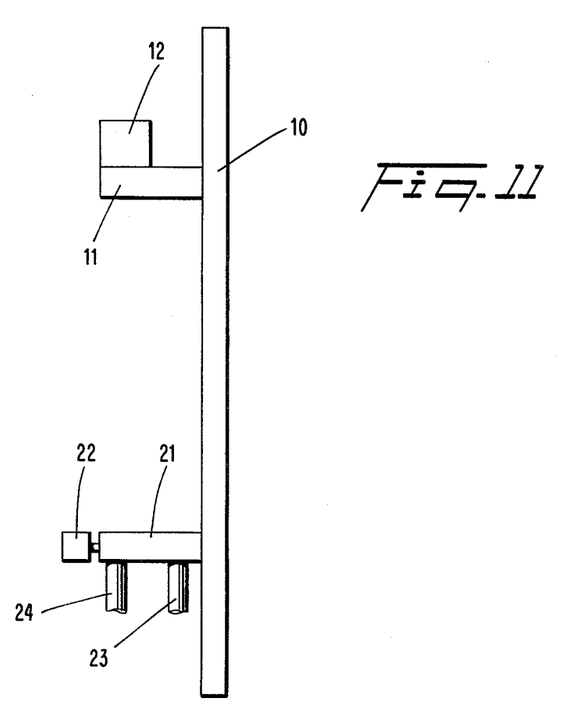
FIG. 11 schematically illustrates a reflector in accordance with the present invention comprising deflection means for use in focusing or defocusing a field of heliostats.
Figure 12:
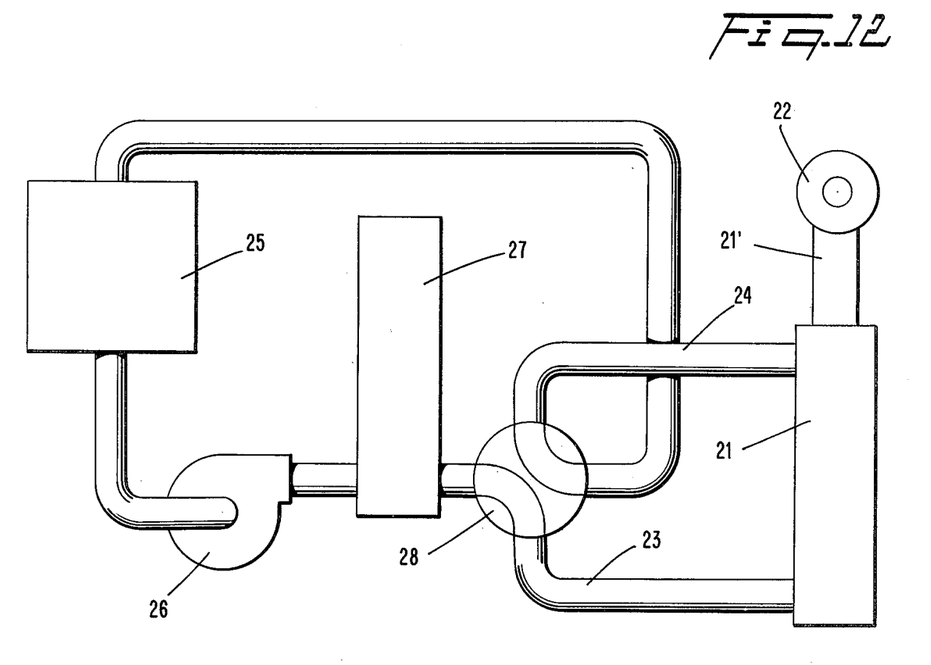
FIG. 12 illustrates a preferred embodiment of the actuating mechanism for the deflection means illustrated in FIG. 10.

FIGS. 11-12 illustrate deflection means which may be associated with the heliostat of the present invention. Focusing or defocusing of a heliostat field is accomplished by means, as embodied herein, adapted to rapidly shift the position of each reflector with respect to its associated declination axis. FIG. 11 schematically illustrates reflector 10 in accordance with the present invention, having bearing support means 11 of fixed length attached thereto. Variable drive means 12 may be associated with bearing 11, as previously discussed with respect to FIG. 5. The second bearing element 22 supporting reflector 10 for rotation about the declination axis may be positioned at a variable distance from the reflector. A preferred embodiment of means for varying the distance between the reflector and the bearing 22 comprises hydraulic cylinder 21, the bearing 22 being affixed to piston 21' associated with the cylinder. Hydraulic fluid in reservoir 25 is forced by means of pump 26 through line 23 into the cylinder. Hydraulic pressure thus causes the piston 21' to rapidly shift the position of bearing 22. Accumulator 27 stores hydraulic energy, thus facilitating very rapid movement of the bearing means and the reflector. Four-way valve 28 may be shifted in order to supply hydraulic fluid under pressure through line 24 to retract the piston and bearing means.

The normal position of the mirror corresponds to the retracted position of bearing 22. When each heliostat is in the focused field position, the reflected image from each will be directed to the common receiver. The unique structure and mode of operation of the present heliostat causes each reflector to rotate about its own center during the day. At any particular time during the day each of the heliostats is pointing in a slightly different direction from every other heliostat in the array. Thus, the declination axis of each heliostat is positioned slightly differently. Therefore, upon simultaneous actuation of the respective deflection means, each reflector will be shifted in a slightly different direction, directing the respective reflected images to different points. Thus, the intense flux directed to the receiver can be very rapidly defocused, directing the solar radiation away from the receiver virtually instantaneously.

In an alternate mode, suitable for thermal shock testing, the deflecting means of all of the heliostats are initially in the extended position. Thus, the reflected images from the respective heliostats are in different directions. The hydraulic actuators are then caused to retract bearings 22, thus shifting the reflectors into the focused position. The reflected images from the respective heliostats are thereby very rapidly focused upon the common target point or receiver, virtually instantaneously providing very high levels of thermal flux thereto.

Self aligning bearings will adequately compensate for the bearing housing shift away from normal to the declination axis. While the focusing-defocusing actuator means has been disclosed as hydraulic means, it is to be understood that such means might also comprise electrically or pneumatically actuated devices. Hydraulic means has the advantageous capability of storing large amounts of energy and releasing that energy very rapidly upon application of a low level electrical signal. This eliminates the need for a large power surge to the field of heliostats when focusing or defocusing is desired.

The present invention has been described with reference to various illustrations showing certain preferred features and embodiments thereof. It is to be understood that the illustrations are not intended to be limiting, and that the scope of the invention is defined solely by the claims appended hereto.

I claim:
1. A heliostat comprising:
 a concave focusing reflector formed as a section of a toroid defined by two unequal radii of curvature in mutually perpendicular planes;
 means for defining a first axis parallel to the earth's polar axis;
 means for defining a declination axis perpendicular thereto, said means defining said declination axis being fixed to said means defining said first axis;
 mounting means for mounting said reflector for rotation about said declination axis and about said first axis; and
 means for driving said reflector in rotation at variable speed about both said axes.

2. A heliostat comprising:
 a focusing reflector comprising the concave face of a section of a toroidal surface and defined by two unequal radii of curvature in mutually perpendicular planes;
 means defining a first axis parallel to the earth's polar axis;
 means defining a declination axis perpendicular to and intersecting said first axis;
 said means defining said declination axis being mounted for rotation about said first axis;
 said reflector being mounted for rotation about said declination axis and for joint rotation about said first axis with said means defining said declination axis;
 first variable speed drive means for rotating said declination axis and said reflector about said first axis; and
 second variable speed drive means for rotating said reflector about said declination axis.

3. A method for directing solar energy to a fixed position comprising:
 positioning a focusing reflector to receive solar energy and to reflect such energy to said position, said reflector formed as a section of a toroid defined by two unequal radii of curvature in mutually perpendicular planes;
 rotating said reflector about a first axis parallel to the earth's polar axis at a first rate;
 rotating said reflector about a second axis intersecting and perpendicular to said first axis at a second rate, rotation of said reflector about said second axis being independent of rotation of said reflector about said first axis; and simultaneously rotating said second axis about said first axis at said first rate.

4. Deflection means for a heliostat comprising:
a reflector;
means supporting said reflector for rotation about at least two axes; and
means for rapidly altering the spatial relationship between said reflector and at least one of said axes.

5. A heliostat as in claim 1, wherein said mounting means comprises:
first bearing means mounting said reflector and said means defining said declination axis for rotation about said first axis; and
second bearing means mounting said reflector for rotation about said declination axis.

6. A heliostat as in claim 5, wherein said means for defining said first axis comprises:
support means having said first bearing means affixed thereto; and
adjustment means for varying the orientation of said support means, thereby orienting said first axis parallel to the earth's polar axis.

7. A heliostat as in claim 6, wherein said support means comprises a base plate, and said adjustment means comprises a hinge for pivotally supporting one edge of said plate and further means to fix the position of said plate on said hinge.

8. A heliostat as in claim 5, wherein said means for defining said first axis comprises:
a fixed support;
wedge means mounted on said support; and
said first bearing means mounted on said wedge means, wherein the configuration of said wedge means is chosen so as to align said first axis with the earth's polar axis.

9. A heliostat as in claim 5, further comprising means for altering the position of said reflector in relation to said declination axis.

10. A heliostat as in claim 1, wherein said means for driving said reflector comprises:
first variable drive means for rotating said reflector and said means defining said declination axis at variable speed about said first axis; and
second variable drive means for rotating said reflector at variable speed about said declination axis.

11. A heliostat as in claim 9 wherein said second bearing means comprises:
a first bearing element associated with said declination axis and said reflector and mounted at a fixed distance from said reflector;
a second bearing element associated with said declination axis and said reflector and mounted at a variable distance from said reflector; and
actuator means for varying the distance of said second bearing element from said reflector, thereby altering the position of said reflector in relation to the declination axis.

12. A heliostat as in claim 11, wherein said actuator means comprise hydraulic means for varying the distance between said reflector and said second bearing element.

13. A field comprising a plurality of heliostats as in any one of claims 1, 2, 9, 11 and 12, positioned generally in a plane which is inclined with respect to a horizontal plane at the earth's surface.

14. A field as in claim 13, wherein each of said heliostats reflects solar radiation incident thereto to a common point, said plane of said array being inclined upwardly in a direction away from said common point.

15. A field comprising a plurality of heliostats according to claim 1 or 2, wherein each of said heliostats reflects solar radiation incident thereto to a common point, further comprising defocusing means for rapidly directing solar radiation reflected from each respective heliostat to different points.

16. A field comprising a plurality of heliostats according to claim 1 or 2, wherein each of said heliostats reflects solar radiation incident thereto to respective different points, and focusing means for rapidly directing solar radiation reflected from each respective heliostat to a common point.

17. A field comprising a plurality of heliostats as in claim 1 or 2, further comprising means associated with each heliostat for rapidly altering the position of the reflector associated with each heliostat in relation to its associated declination axis.

18. A field as in claim 17, wherein each of said heliostats reflects solar radiation incident thereto to a common point, and said means for altering the position of each reflector comprises means for rapidly moving each of said respective reflectors in a different direction.

19. A field as in claim 18, wherein each of said plurality of heliostats is in differing spatial relationship with respect to said common point, each declination axis being oriented differently so as to compensate for said differing spatial relationships and to direct solar radiation incident to each reflector to said common point, said means for altering the position of each reflector in relation to its associated declination axis comprising means for altering the position of each reflector in an identical manner with respect to its associated declination axis.

20. A method as in claim 3, comprising directing solar energy to a position which is laterally displaced relative to said first axis.

21. A method as in claim 3 or 20, comprising directing solar energy to a position which is displaced vertically from a horizontal plane containing the intersection of said first and second axes.

22. A method as in claim 3, comprising positioning a field of said reflectors to receive solar energy and to reflect such energy to said position;
rotating each reflector about its respective first axis at a first rate peculiar to each reflector;
rotating each reflector about its respective second axis at a second rate peculiar to each reflector; and
simultaneously rotating said second axes about said respective first axes at said respective first rates.

23. A method as in claim 22 further comprising the step of rapidly altering the position of each of said reflectors so as to direct solar energy from each reflector to a respective different position other than said fixed position.

24. Deflection means as in claim 4, said means supporting said reflector comprising:
means defining a first axis parallel to the earth's polar axis;
means defining a declination axis intersecting and perpendicular to said first axis; and
means supporting said reflector for rotation about said declination axis; and
means for altering the spatial relationship between said reflector and said declination axis.

25. Deflection means as in claim 24, wherein said means for altering the spatial relationship between said reflector and said declination axis comprises:
- a first bearing element associated with said declination axis and said reflector, and mounted at a fixed distance from said reflector;
- a second bearing element associated with said declination axis and said reflector and mounted at a variable distance from said reflector; and
- actuator means for varying the distance of said second bearing means from said reflector, thereby altering the position of said reflector with respect to said declination axis.

26. Deflection means as in claim 24, wherein said actuator means comprises hydraulic means.

27. A method comprising:
- positioning a plurality of focusing reflectors to receive solar energy, each of said reflectors formed as a section of a toroid defined by two unequal radii of curvature in mutually perpendicular planes;
- directing the solar energy reflected from each of said reflectors to respectively different positions; and
- rapidly altering the position of each of said reflectors to direct solar energy reflected from all of said reflectors to a common point.

* * * * *